United States Patent
Campbell et al.

(10) Patent No.: US 11,294,075 B2
(45) Date of Patent: Apr. 5, 2022

(54) NON-RESONANT ELECTRON SPIN RESONANT PROBE AND ASSOCIATED HARDWARE

(71) Applicant: Global Resonance Technologies, LLC, Washington, DC (US)

(72) Inventors: Jason Campbell, Washington, DC (US); Jason Ryan, Washington, DC (US); Kin Cheung, Washington, DC (US); Marc Desrosiers, Washington, DC (US); Robert Gougelet, Washington, DC (US); Pragya Shrestha, Washington, DC (US)

(73) Assignee: Government of the United States of America as represented by the Secretary of Commerce, Gaithersburg, MD (US)

( * ) Notice: Subject to any disclaimer, the term of this patent is extended or adjusted under 35 U.S.C. 154(b) by 0 days.

(21) Appl. No.: 16/489,974

(22) PCT Filed: Mar. 2, 2018

(86) PCT No.: PCT/US2018/020679
§ 371 (c)(1),
(2) Date: Aug. 29, 2019

(87) PCT Pub. No.: WO2018/160978
PCT Pub. Date: Sep. 7, 2018

(65) Prior Publication Data
US 2020/0003909 A1    Jan. 2, 2020

Related U.S. Application Data

(60) Provisional application No. 62/466,478, filed on Mar. 3, 2017.

(51) Int. Cl.
*G01T 1/02* (2006.01)
*G01N 24/10* (2006.01)

(52) U.S. Cl.
CPC .............. *G01T 1/02* (2013.01); *G01N 24/10* (2013.01)

(58) Field of Classification Search
CPC .... G01T 1/02; G01T 7/00; G01T 1/04; G01N 24/10
See application file for complete search history.

(56) References Cited

U.S. PATENT DOCUMENTS

| | | | |
|---|---|---|---|
| 5,528,146 A * | 6/1996 | Kwiram | G01R 33/60 324/307 |
| 7,420,187 B1 | 9/2008 | Klemic et al. | |

(Continued)

FOREIGN PATENT DOCUMENTS

| | | |
|---|---|---|
| JP | 2006027239 A | 2/1994 |
| JP | H06027239 A | 2/1994 |

(Continued)

OTHER PUBLICATIONS

International Search Report issued in PCT/US2018/020679, dated May 24, 2018.
(Continued)

*Primary Examiner* — Marcus H Taningco
(74) *Attorney, Agent, or Firm* — Burns & Levinson LLP; Jerry Cohen

(57) ABSTRACT

A non-resonant ESR instrument/probe that can easily accept an identification card (or the like) form factor device incorporating a radiation sensitive material providing reliable and calibrated dose measurement stably and permanently stored into the device and deployed to individual, persons, animals, or objects, to act as a personal-surrogate dosimeter primarily in radiation mass events with radiation dose derived from a (Continued)

measure of the radiation induced changes in paramagnetic density obtained via transmission mode electron spin resonance measurements.

8 Claims, 7 Drawing Sheets

(56) References Cited

U.S. PATENT DOCUMENTS

| | | | |
|---|---|---|---|
| 9,507,004 | B2 | 11/2016 | Campbell et al. |
| 2003/0099582 | A1 | 5/2003 | Steklenski et al. |
| 2004/0084631 | A1* | 5/2004 | Spoonhower ............. G01T 1/04 |
| | | | 250/474.1 |
| 2004/0184955 | A1* | 9/2004 | Steklenski ................ G01T 1/04 |
| | | | 422/400 |
| 2007/0007961 | A1* | 1/2007 | Habara ............ G01R 33/34053 |
| | | | 324/316 |
| 2008/0150643 | A1* | 6/2008 | Suzuki .................. H01P 11/003 |
| | | | 331/107 R |
| 2009/0115605 | A1 | 5/2009 | Ravenis et al. |
| 2012/0235062 | A1 | 9/2012 | Patel |
| 2014/0091802 | A1* | 4/2014 | Yang ...................... G01R 33/60 |
| | | | 324/322 |
| 2015/0076356 | A1 | 3/2015 | Gougelet et al. |
| 2019/0302306 | A1* | 10/2019 | Kulbrandstad ........ G01N 24/10 |

FOREIGN PATENT DOCUMENTS

| | | |
|---|---|---|
| JP | 200469352 A | 3/2004 |
| JP | 2004069352 A | 3/2004 |
| JP | 2016530483 A | 9/2016 |
| KR | 20160000105 A | 1/2016 |
| KR | 1020160000105 A | 1/2016 |

OTHER PUBLICATIONS

Office Action issued in Japanese application No. 2019-560747, dated Sep. 23, 2020.

Japanese Office Action dated Mar. 4, 2021.

* cited by examiner

NON-RESONANT ELECTRON SPIN RESONANT PROBE AND ASSOCIATED HARDWARE

CROSS-REFERENCE TO RELATED APPLICATIONS

This application is a U.S. national stage application under 35 U.S.C. 371 of co-pending International Application No. PCT/US2018/020679, filed on Mar. 2, 2018, and entitled NON-RESONANT ELECTRON SPIN RESONANT PROBE AND ASSOCIATED HARDWARE which in turn claims priority to and benefit of U.S. Provisional Application No. 62/466,478, filed on Mar. 3, 2017, which are incorporated by reference herein in their entirety for all purposes.

STATEMENT OF GOVERNMENT INTEREST

The invention described and claimed herein includes United States government employee co-inventors. The government has an interest therein.

BACKGROUND OF INVENTION

(1.) Field of the Invention

It is an object of the present invention to significantly decrease death and illness due to inefficient utilization of resources and limited access to medical care after a nuclear or radiological mass casualty event. The present invention fulfills that object by providing an advanced tiered system using a single platform technology for sorting patients in response to a catastrophic mass casualty nuclear or radiological event with the necessary accuracy, certifications and confidence to support clinical decisions consistent with screening and triage categories for acute radiation syndrome (ARS) as described by the CDC (U.S. Center for Disease Control). Physical dosimetry readings, when readily available, can easily be incorporated into various ARS treatment protocols including Radiation Emergency Medical Management (REMM) and Radiation Injury Treatment Network (RITN). A related object objective of the present invention is to enable CDC's Emergency Responder Health Monitoring and Surveillance (EHRMS) system and like systems to incorporate Emergency Response Dosimetry System (ERDS) measurements for long term surveillance and monitoring of first responders and healthcare workers and by persons in the area of radiation incidents. ERDS core technology may be modified for utilization in other non-radiation mass casualty events.

Further objectives include enabling patient medical records or an incident specific data base with enhanced capability to document ERDS measurements for long term healthcare and monitoring and to provide critical data for medical research to determine effectiveness, timing, dosing, and administration of medical countermeasures.

The initial sorting process may involve a large percentage of the population in close enough proximity to experience blast effects including temporary blindness, burns and injuries. Loss of infrastructure and communications will lead to heightened anxiety with widespread panic rapidly overwhelming limited medical resources. In a targeted large metropolitan area, possibly many millions of victims, including children, victims with a wide variety of disabilities, and those with acute and chronic injuries and illnesses, will believe they have been affected by radiation exposure, yet will not require immediate medical care. Individuals with ERDS measurements greater than 2 Gy can be immediately sent to medical screening and triage. ERDS measurements below 2 Gy and above an established baseline exposure may require additional medical follow up, long-term surveillance, or additional triage and screening resulting from partial exposure due to shielding, scattering, or distance from blast.

Accurate and rapid initial sorting can lead to efficient triage, screening, administration of medical countermeasures, evacuation, decontamination, supportive care and personal protective actions. Early and medically precise therapy can save countless lives and minimize the severity of acute radiation illnesses. Sufficient speed and precision in the initial sorting process can limit the impact on additional medical services minimizing additional illness and death resulting from limited access to medical care.

(2.) Background

Well intentioned previously patented and unpatented systems and processes attempted to use retrospective physical dosimetry but failed to provide a practical device or system meeting the stringent requirements necessary for field deployment, pre- or post-massive catastrophic nuclear or radiological mass casualty event. Decades of effort to operationalize retrospective dosimetry including thermal and optical luminescent devices, geographic dosimetry computational analysis, electron spin resonance (ESR), and multiple biomarkers (including white blood cell counts, serum amylase, C-reactive protein, γH2AX protein biomarker, chromosomal aberrations, genetic studies and mutation assays, and tooth and fingernail dosimetry) have proven inadequate for a variety of reasons including costs, environmental variables, calibration, certification, scan and cycle times, stability, size, accuracy, reliability, threshold of detection, movement instability, field deployability, staffing requirements, and acceptance by the medical community. Technical limitations of conventional ESR machines include electromagnets and resonance chambers with corresponding increased weight, size, complexity, scan time, total cycle time, safety hazards, power requirements, skilled staffing needs, poor reliability and inaccurate measurements. Even if the multiple environmental variables and accuracy issues are resolved; the size, complexity and cost will always limit their use in a mass casualty event. Tooth and fingernail readings specifically have limited clinical value due to exposure measurements in areas with clinically insignificant amounts of nearby bone marrow. Some references are listed as follows:

https://emergency.cdc.gov/radiation/pdf/ars.pdf
http://www.tandfonline.com/doi/pdf/10.1080/09553002.2016.1227106
https://doi.org/10.1371/journal.pone.0131913
http://eurados.org/~/media/Files/Eurados/documents/Working_Groups/2015/progressreport/WG10.pdf?la=en
https://www.ncbi.nlm.nih.gov/pmc/articles/PMC4086260/
http://www.tandfonline.com/doi/pdf/10.1080/09553002.2016.1221545
https://www.remm.nlm.gov/AinsburyTable1.pdf
https://www.ncbi.nlm.nih.gov/pubmed/27919334
https://thebulletin.org/measuring-radiation-doses-mass-casualty-emergencies11162
https://www.epa.gov/sites/production/files/2017-01/documents/epa_pag_manual_final_revisions_01-11-2017_cover_disclaimer_8.pdf U.S. Published Application No. 2009/0224176
U.S. Pat. No. 9,507,004 Campbell et al.
U.S. Pat. No. 9,400,331 Gougelet et al.
U.S. Pat. No. 9,261,604 Gougelet et al.
Campbell et al. ESR *Scanning Probe spectra scope for Biochemical Studies*, Analytical Chemistry (Apr. 13, 2015) pp. 4810-4916.
P. F. Regulla et al., *"Dosimetry by ESR spectroscopy of alanine."* 33 Journal of Applied Radiation and ISOT 1101-14 (1982)
McLaughlin et al., *"Dosimetry systems for radiation on processing"* 46 Radiat. Phys. Chem. 63-74 (1995)
M. A. V. Alenca, *"The TL Aided OSL Study of Hydroxyapatite for Dosimetric Applications,"* 2009 Int'l Nuclear Atlantic Conf. INAC 2009. ISBN 978-85-991-03-8
N. Dankov et al. *"Modification of the Structures and Compositions of $Ca_{10}(PO_4)_6(OH)_2$ Ceramic Coatings by changing the deposition conditions in $O_2$ and $Ar_1$"* 2014 J. Physic. Series 514-012017
M. Prakasam et al. *"Properties and applications of Dense Hydroxypatite: A Review"* J. Functional BioMat'ls 2015 (6), 1099-1140

All these references are incorporated herein by reference as though set out at length herein.

In sum, successful utilization of retrospective personal dosimetry, in response to an intentional or accidental nuclear detonation exposure (or other radiation exposure, e.g., catastrophic reactor failure) mass casualty event would effectively and reliably identify those victims who have received clinically significant doses of ionizing radiation. The critical priority is to categorize or sort those in whom immediate administration of medical countermeasures is imperative, follow up care can be delayed or those who will require palliative care. A significant percentage of the presenting population, possibly exceeding 90%, will not require emergent care, yet will overwhelm limited medical resources. Numerous attempts at effective mass casualty retrospective dosimetry have been ineffective due inherent material, environmental variabilities, cost and logistical issues. Thus, a new methodology is required.

SUMMARY OF THE INVENTION

The Emergency Response Dosimetry System (ERDS) provided in the present invention effectively overcomes the inadequacies of other blood-based and tooth/fingernail radiation-dose approach and is capable of rapid self-assessment not requiring specialized technical or medical assistance of the individual's received dose. The ERDS system comprises a method and apparatus/devices that rapidly assesses patients' doses in the aftermath of a mass-casualty radiation-exposure event. The present invention allows citizens to assess themselves (at the 2±0.5 Gray (Gy) exposure level) using a ubiquitous dosimeter embedded in commercial and non-commercial media, similar to customary identification (ID) cards (including dog tags, key fobs, lapel or lanyard pins or any such card-or alternate form-factor items embedded in clothing or personal accessories or objects otherwise in close proximity to an individual) compatible with high-throughput ERDS instruments. The self-assessment feature of this system allows patients to be reassured, psychologically comforted, and provided information to make informed decisions. Patients can then seek, or be directed, to appropriate action, without intervention by moderately or highly skilled first responders and/or public health officials or with minimal aid of such persons.

The self-assessment system can be replaced or supplemented, either self-directed or by responding authorities, to various degrees of assistance from available medical and technical personnel supporting dosimetry measurements, screening and triage, administration of supportive and behavioral healthcare including administration of medical countermeasures. Ongoing dialog and communication of ERDS measurements with incident commanders and radiation support specialists will further support response and recovery efforts.

Actual personal received dose is derived via electron-spin-resonance measurement of the number or density of free radicals present in a fixed volume of radiation-sensitive material. The key attribute of the radiation-sensitive material is the generation of stable free radicals in response to ionizing radiation. In this scenario, the number of free radicals present in the radiation-sensitive material is directly proportional to received dose. Several such materials are known to proportionately generate free radicals in response to ionizing radiation. These include (but are not limited to) L-alanine, calcium and lithium formate and hydroxyapatite. This invention involves the integration of this radiation-sensitive material into the form factor of an ID card (or similar device, as indicated above). The radiation-sensitive material can be placed anywhere on the card but preferentially located laterally within the card near an edge. The encased or encapsulated radiation-sensitive material, in this case alanine, transforms the ubiquitous ID card into a personal physical dosimeter, capable of long term cumulative readings and precise personal transfer dosimetry, and therefore an effective personal-surrogate during mass casualty events. There are no additional requirements for the individual confirmatory measurements nor is there a requirement for partial or complete destruction of dosimetry card.

This ID-card-based personal transfer dosimeter is complemented by an optimized. High Definition Magnetic Resonance (HDMR) detector instrument, specifically tuned to rapidly and accurately detect the chosen radiation-sensitive material's ESR spectrum. An ESR condition is achieved by the application of: (1) an appropriately large quasi-DC magnetic field, which is homogenous over the radiation-sensitive material's volume and (2) the simultaneous application of an appropriate microwave magnetic field to the same radiation-sensitive material's volume. In this embodiment, the large quasi-DC magnetic field is satisfied via a permanent magnet or conventional electromagnet. However, the microwave magnetic field is achieved in a novel way: it is coupled into the radiation-sensitive material by using a transmission line structure to both excite, and subsequently detect, the radiation-induced free radical resonances. The non-resonant probe builds on the teachings of a previous patent (U.S. Pat. No. 9,507,004) but instead works in transmission mode preferably using the artifact described below or using other artifacts for similar mode implementation (not reflection mode as in the '004 patent). The non-resonant probe can be integrated into the preferred design embodiments, and others, using a simple microwave micro-strip transmission line structure (a metal signal line overlaid on a ground plane). The design of the transmission line is such that the ID card, containing radiation-sensitive material, can be inserted between the signal line and the ground plane. Upon sending an appropriate microwave signal down the transmission line, a microwave magnetic field is generated orthogonal to the signal line plane within the thickness of the ID card. This non-resonant microwave transmission line arrangement results in an extremely broadband method to introduce and detect microwave magnetic fields between the signal line and ground plane. At the resonance condition of the radiation-induced free-radicals, the combination of the large, quasi-DC magnetic field and the microwave magnetic field induces a net absorption and dispersion, proportional to the number/density of free radicals. Measurement of this net absorption and dispersion in a transmitted microwave signal thus gives a measure of the number/density of free radicals, and by extension, the person's received radiation dose. The arrangement represents a user-accessible method to measure dose absorbed in the radiation-sensitive material contained within an ID card. While ESR-derived measurement of radiation dose is a well-established practice, incorporating the non-resonant electron spin resonance probe is wholly new to radiation dosimetry, and alleviates nearly all the current limitations of other deployable ESR-based dosimetry efforts.

In this embodiment, the detection methods (ultra-sensitive microwave bridge design) may be borrowed in its entirety from the above-cited '004 patent. However, the design of the non-resonant probe and personal dosimeter ID card are entirely new and are the subject of this disclosure. This new ESR sensor system provides greatly enhanced sensitivity resulting directly to shorter duration and clinically accurate scans, both critically necessary for mass casualty radiological or nuclear events. Further optimization of the ESR sensor to maximize sensitivity of a single chosen radiation-sensitive material's spectrum facilitates a highly automated measurement of dose, fulfilling cost, accuracy, safety and ease of use; all necessary for acceptance and use in a catastrophic mass casualty event. Radiation sensitive materials can be singly or added in combination for increased sensitivity, of single or multiple radiation types.

The present invention provides a combination of several innovative and disruptive technologies optimally designed to allow a cost effective and operational retrospective public health countermeasure pre-deployed across large populations at risk for acute and chronic illness as a result of intentional or accidental ionizing radiation exposure. ERDS has two major components; a High Definition Magnetic Resonance automated dosimetry reader (ADR) and a complementary automated dosimetry card (ADC). The ADC will be widely distributed, with a purified dosimetry material, such as L-Alanine that is calibrated, documented and traceable to national standards. The ADC combined with the increased accuracy of the non-resonant ESR probe and associated hardware and software will reliably provide real-time ionizing exposure measurements that can be used to sort victims in need of urgent medical care and reduce vulnerabilities and mitigate post-event consequences of a catastrophic nuclear or radiological event. This is the first described system that can be operationally deployed as an effective public health countermeasure in a catastrophic mass casualty nuclear or radiological event.

The present invention, ERDS is a combination of a unique High Definition Magnetic Resonance-based ADR with an innovative probe and magnet assembly, matched currently with an alanine dosimeter embedded in a card meeting all requirements and operational capabilities for field deployment as a widespread and effective public health mitigation strategy. Dosimetry scans can be made in a targeted and tiered response, significantly increasing throughput and accuracy. Clinically significant measurements can be obtained in seconds with increasingly sensitive measurements obtained with increased scan time.

ERDS Tier 1. The first-tier scan is the most important measurement, emphasizing high throughput and accuracy sorting out those victims with life threating exposure levels and therefore at high risk of developing acute radiation syndrome. Victims with higher exposure will have faster scan times. Rapid self-assessment utilizing a portable, ruggedized and user-friendly miniaturized ATM type form factor, in an austere environment requiring minimal staffing and personnel will provide a near real-time and accurate reading with up to date visual instructions for victims. Tier 1 threshold will be set at 2 Gray (Gamma irradiation) during the initial phase of sorting, and provide an essential building block for subsequent triage, screening and response activities. Those persons with a scan reading over 2 Gy will require additional screening and triage and should be sent immediately to available medical resources. Victims under 2 Gy can be safely evacuated, take personal protection actions, be provided with continued medical and supportive care, monitored over time and be reunified with family and community. Confirmatory and cumulative readings can be taken as resources become available. Tier 1 field deployable measuring stations, rapidly deployable portable self-assessment units, hand carried shoulder harness, neck sling or back pack form factors mobile mounted and transported arrays can all easily accommodate ERDS. Software will be specifically configured for speed, accuracy, safety, and ease of use to comfort and reassure victims. A person specific and/or incident specific electronic medical record (EMR) with a unique number can be initiated at the ERDS Tier 1 level. Demographic data can be obtained from the driver's license or ID cards and measurements, GPS location, and time will automatically be added to the EMR, preferably added to the dose recording on the same or associated media. This data can be cached, cloud-based, or physically or electronically imbedded on individual ADCs. All ADRs will have multiple and redundant communication capabilities as well as the ability to locally cache data. ERDS measurements will support the diagnosis, treatment, and documentation required for the projected increased number of victims surviving the initial stage of ARS.

ERDS Tier 2. Prior to additional screening, triage and medical treatment, a victim's ADC is inserted in a second-tier measurement for confirmatory initial and significant ongoing cumulative exposure measurements. Tier 2 will support the input of additional essential information. Victims can provide information such as allergies, symptoms, exposure location, co-existing medical conditions, etc., while first responders and health care workers can provide triage level, vital signs, injury and illness assessments, and medication dosing and time of administration. Other data can be accessed including medical history from the personal surrogate card itself or access from external records via wireless and/or wired networks. Tier 2 design and configuration can allow limited input of additional information via pull down menus and touch screens. Some of Tier 1 and Tier 2 procedures can be interrupted or reversed in particular situations.

ERDS Tier 3. A third ERDS Tier would be available to those less than 2 Gy and who require continuing reassurance, additional confirmation or long-term monitoring and follow up. This group is outside of the early crisis phase allowing extended scan time for significantly greater accuracy and lower threshold of detection. These measurements support healthcare surveillance and provide data for long-term consequences of sub-clinical radiation exposure with undetermined clinical significance. One example of many is the effect low dose exposure on cataract development of radiation cataractogenesis, but little is known about single acute exposure over a short period of time.

ERDS First Responder and Health Care worker. ADCs can be deployed pre-event with first responders, health care workers, and military and federal government personnel with availability of ADRs for self-assessment within the workplace environment and under response and battlefield conditions to confirm operational readiness and initial exposure reading immediately post event.

ERDS Commercial Applications. Cumulative readings over time for civilian populations and at-risk occupations exposures can document long term chronic exposures and further support public health countermeasures by accumulating background and baseline occupations, geographical and environmental exposures thereby increasing accuracy of acute exposure readings.

A typical Tier 1-3 allocation of sensitivity, cycle time and related functions, medical actions and estimated presenting population can be the following:

| Tier | Sensitivity [Gy] | Cycle Time (maximum estimate) | Function | Medical Actions | Estimated presenting population |
|---|---|---|---|---|---|
| 1 | 2 | 15 seconds | Rapid sorting | Direct to medical treatment or evacuation | 100% |
| 2 | 0.3 | 5 minutes | Pre-treatment measurement confirmation | Screening and triage Administration of medical countermeasures | 10% |
| 3 | 0.1 | 35 minutes | Cumulative exposure long-term surveillance | Continued measurements, long term medical evaluation | 90% |

The present invention includes use of a specific calibrated dose-responsive material with linear and proven correlation to actual dose received thus providing a significant improvement over in-vivo measurement in the first critical hours to days and when other means are not practical or logistically unavailable. Such designations avoid difficulties with state-of-the-art biomarkers that have varying onset and duration of expression as well as significant cost and logistical issues.

The present invention provides a deployable non-resonant ESR-based sensor which rapidly derives a retrospective dose received in a micro-sample of crystalline alanine embedded in personal identification cards or like personal surrogate. The interface between the identification card and the ESR-based sensor is akin to an ATM machine or a simplified kiosk, in a significantly smaller form factor, however with almost universal familiarity to the general public. Collectively, this approach enables a timely and efficient emergency medical response and supports additional clinical and laboratory screening and triage for those most in need. The non-resonant ESR-based sensor detects the gamma-induced deamination of crystalline alanine using a micro strip transmission-line based identification card device interface, a highly sensitive microwave detection bridge circuit, and a compact permanent magnet apparatus. The crystalline alanine dosimeter material is embedded in the identification card. The cost-effective mass manufacturing of alanine embedded cards is an essential feature of an effective public health pre-event mitigation activity and eliminates a significant barrier to widespread distribution. This system is designed such that the identification card is physically inserted between the signal line and ground plane of the microwave transmission line. A highly sensitive X-band microwave detection bridge circuit is rapidly tuned to the resonant conditions of the central alanine peak. The magnetic field is swept and modulated by small coils to detect the central peak in the alanine ESR spectrum. Dose is derived from a comparison of the amplitude of the central peak in an individual's identification card to that of a calibrated identification card. Permanent magnets are utilized to generate the majority of the static field to allow for a compact point of care system with low power consumption.

The non-resonant ESR-based sensor can reliably detect 2±0.5 Gy in less than 2 minutes. Since the ESR-based sensor does not require operational expertise, self-screening can proceed with very little oversight allowing the trained medical staff to focus on treatment of patients most in need. In addition, the cumulative response of alanine dosimeters allows for future dose assessments which may identify other environmental sources of irradiation. Rapid and reliable screening of individuals in the aftermath of a nuclear event can thus be accomplished by using identification cards embedded with alanine dosimeters and a highly sensitive compact non-resonant ESR sensor.

The present invention comprises a method and system (apparatus/devices) to rapidly sort patients in the aftermath of a mass casualty radiation exposure event. The present invention allows citizens to assess themselves (at the 2 Gray (Gy)±0.5 Gy exposure level) using a ubiquitous dosimeter embedded in government (or other authorities) issued ID card stock and commercial media similar to customary identification cards; tags, key fobs, lapel and lanyard pins, dog tags or any such card form factor or alternate items embedded in clothing, personal accessories, or in close proximity, compatible with high throughout rapidly ERDS devices. Armed with this readily accessible dose information, patients can then seek or be directed as to whether and how to seek appropriate action without the need of first highly skilled responder and/or public health official intervention. The person associated card data and measurement can also be copied to central systems to enable replacement of the card if the original is lost and/or use of the data on research.

This invention involves the integration of a non-resonant electron spin resonance radiation sensitive material (RSM) into an identification card (or the like as indicated above) form factor device to perform electron spin resonance of the density of paramagnetic centers arising from radiation exposure generally without frequency spectrum screening (i.e. non-spectroscopic). The material is capable of capturing and stably maintaining a radiation dose. This material is then complemented by an optimized electron spin resonance (ESR) instrument designed for detection of specific RSM spectra, preferably configured for operation in transmission mode rather than reflection mode. This combination drastically reduces the physical weight and foot print of the electron spin resonance instrument and facilitates incorporation of personal dosimeter material carried in a card form factor device or the like in close proximity to each person. The ADR may be deployed pre-event, during or soon after (preferably before).

The optimized design of this dosimeter system and method of deployment of the card-form-factor devices and detector instruments focuses on detection of a specific measurement dosage associated with radiation dosage impacting the material with lasting effects to become spin-labeled samples which facilitates a very highly automated measurement of dose which is easily interfaced with widely-deployed-to-the-general-public-instruments (kiosks or ATMs).

The non-resonant instrument builds on the teachings of a previous patent (U.S. Pat. No. 9,507,004) but instead works in transmission mode (not reflection mode). The non-resonant instrument can comprise in preferred embodiments, among others, a simple microwave micro-strip transmission line structure (metal line overlaid on a ground plane). This probe acts as an antenna to both excite and detect electron spin resonance transitions in samples placed in close proximity to the probe. The line can be either (1) integrated directly on the identification card (or the like) dosimeter device or (2) be placed in close proximity to the identification card (or the like) during measurement. While electron spin resonance derived measures of radiation dose are a well-established practice, incorporating the non-resonant electron spin resonance with a fixed frequency, use of permanent magnetic assemblies with minimal electromagnetic (EM) coils added for modulation is wholly new to radiation dosimetry, and alleviates nearly all of the current limitations of other deployable ESR-based dosimetry efforts and other state-of-the-art efforts. Calibration can be established by using a known calibration standard as a card irradiated to a known specific level e.g. 2Gy+1-0.5Gy and placed in the ESR instrument in proximity to the added microwave transmission line of the instrument. The reference card can be used to re-test the instrument at a given time intervals (e.g. daily, weekly) or at intervals of usage (say, after each 1000 tests with personal surrogate card devices. The radiation sensitive material in the reference card can be L-alanine as in personal surrogate cards or another radiation sensitive material such as DPPH (2,2-diphenyl-1-picryhadrazyl), well known per se for use as free radical scavengers or hydrogen donors and as a standard of the position and intensity of electron paramagnetic signals. An example of use of DPPH calibration for ESR is given at http://wanda.fiu.edu/teaching/courses/modern-lab-manual/ESR.html. Preferably in the field, there would be the use of irradiated reference cards, standardized and certified for routine maintenance while stockpiled and utilized more frequently while deployed.

Electron spin resonance (ESR) spectroscopy is also described in the article, "Electron Spin Resonance Scanning Probe Spectroscopy for Ultrasensitive Biochemical Studies," Campbell et al. published Apr. 13, 2015, Analytical Chemistry pp. 4910-4916, reviewing prior developments and introducing an enhanced capability for investigation of paramagnetic free radicals (or electron spins) in soft matter or solid-state material. The described instrument provides sensitivity improvement of $20 \times 10^3$ better than commercial systems. The entire contents of the above cited '004 patent and Analytical Chemistry paper are incorporated herein by reference as though set out at length herein, subject to modification or variation as set forth herein.

The near elimination of sample restrictions allows for a remarkable geometric optimization of the non-resonant probe to best complement a given sample and its carrier. This is in stark contrast to other electron spin resonance-based detection systems where the sample must be modified to complement the measurement. Considering that, by definition, the identification card or the like (embedded with RSM) presents a standardized regular sample structure, resulting in a great improvement in sensitivity, speed and management of mass causality sorting compared to prior art approaches.

The devices and methods have primary application for humans and the system analogous to the card form factor device dosimeters described herein can also be used for rapid, widespread analysis of large population to deal with other mass causality conditions including other radiation imaging events such as frequent and/or high intensity x-ray exposures. Important secondary applications may include e.g., service and pet animals and plants and objects of concern priority in an impacted area where universal real-time monitoring is unrealistic and cost-prohibitive. The device and methods can also be applied to non-radiation actual or suspected mass causality events including biological and chemical catastrophes captured during or indirectly generating stable free radicals or free radical metabolites measurable by the probe described herein in a material within or on the personal surrogate card or alternate sampling mechanism utilizing microfluidics, micropipette or alternative miniaturized sample collection and measurement system as an integral or subsequently attached system.

Certain non-radiation energy mass causality events such as toxic chemical or biological releases, evolving infectious diseases and pandemics may also be addressed through the basic system/process of the present invention. Within the same card form factor, the channel currently used for a calibrated and exact amount of alanine sample can be modified to accept known or unknown in vivo or in vitro samples directly. These samples may include direct identification of chemical, biological or nuclear agents or indirect specific or non-specific biomarkers indicating direct physiological effect.

The identification card form factor can also carry related information of the subject who carries it or may have it affixed or embedded, such as name and/or card identification, association, affiliations, medical or like conditions or history and special needs as well as exposure monitoring (presently or retrospectively). They would preferably be stored in a way to be visible, optically, electrically or magnetically placed. The precise design, accuracy and low power requirements for measurements will not interfere with the magnetic or electronic information placed on ADCs. ERDS readings, screening, triage, medicine dose and administration times can be incorporated onto the card via printing or electronic means, thus allowing the initial formation of an incident specific or transfer electronic medical record that remains with the patient. Because the present card does not need optically transparent surface (as in optically stimulated luminescent dosimetry) the above collateral information can be applied to the surfaces.

As noted above, clinically significant scans can be obtained in seconds with subclinical measurements obtained simply by increasing scan time and initial thresholds may be set at 2 Gy during one or more initial phases of sorting, triage and screening. Screened patients of such phase(s) can be decontaminated, evacuated, provided continued medical and supportive care and reunified with their families and communities. Expanding the feasible scope of mitigation with limited human mechanical instruments and communicate sources.

Increased sensitivity also allows vast expansion of sorting to significantly overlap with other medical screening and triage and contributes to additional medical decision making as treatment progresses.

Other object features, and aspects of the invention will be clear from the following referenced drawing figures and text showing embodiments of the invention.

BRIEF DESCRIPTION OF THE DRAWINGS

The following descriptions explain how the product functions, referencing the drawings, but does not indicate possible limitations of usage.

DETAILED DESCRIPTION OF EMBODIMENTS

Figure 1A:
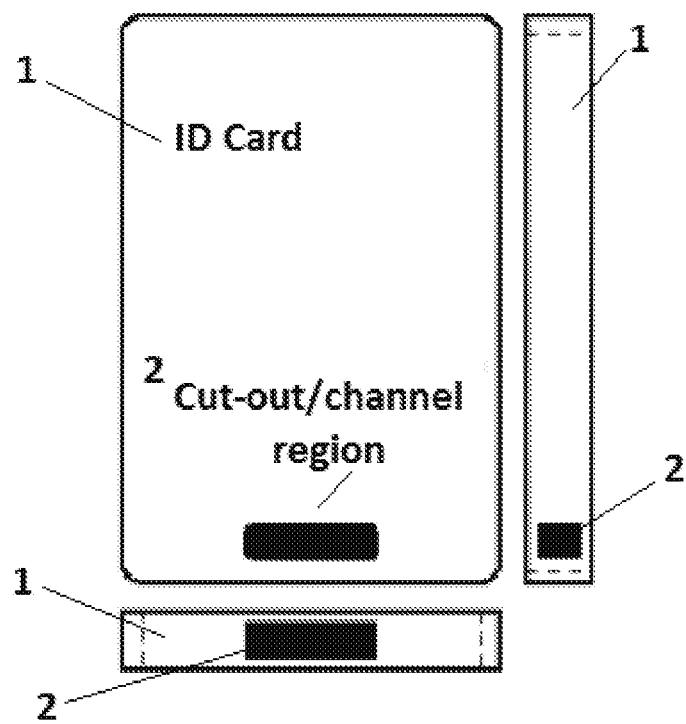
FIGS. 1A and 1B. show an identification (ID) card embodiment containing a personal dosimeter that is embedded in a 'pocket' (cut out/channel region) of radiation-sensitive material within the thin card, FIG. 1A showing top side end views of the card and dosimeter and FIG. 1B showing top side and end views of the card for receiving radiation sensitive material in its section/channel region material to be placed in the card.
Figure 1B:
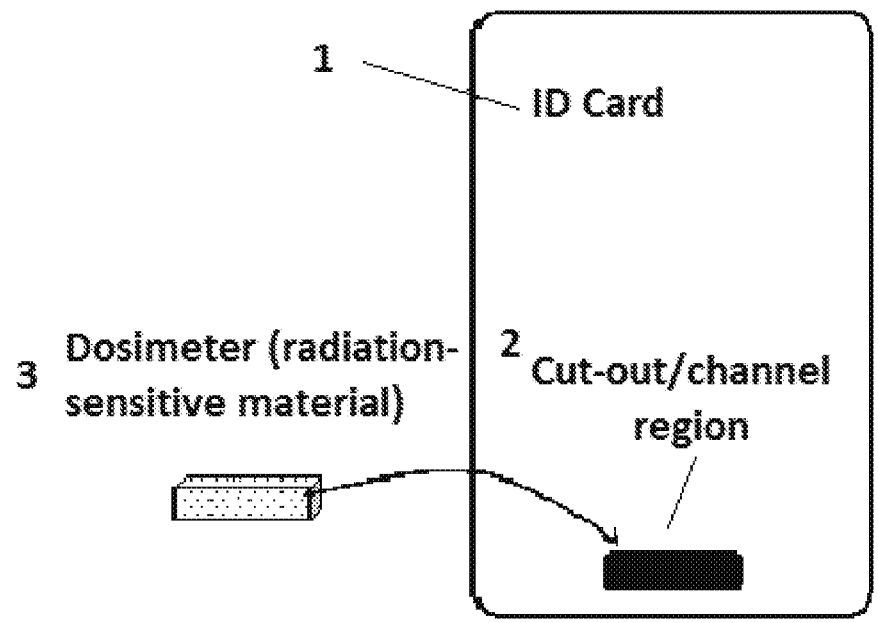

FIG. 1A shows in top side edge and end views and FIG. 1B shows in similar views and exploded form that a portion of the ID card 1 includes a radiation-sensitive material (RSM) 2 in a pocket (cut-out channel region). This pocket-contained RSM serves as a dosimeter, embedded and positioned within the thickness of the ID card during its manufacture (typically by lamination or encapsulation). In this manner, the ID card can be mass-manufactured. The radiation-sensitive ID card stock can be utilized as the starting material in the manufacture of a variety of applications, including but not limited to federal-, state-, and local-government issued ID cards, state-issued drivers' licenses, military-issued ID cards, and commercial-issued cards such as bank-issued credit and ATM-access cards.

The volume of the encased RSM will depend on the composition of the chosen RSM and final ID Card dimensions. ESR-derived dosimetry is a transfer dosimetry measurement. Thereby an ESR measurement of the total number of stable free radicals generated in the RSM is related to a calibrated total absorbed dose. Thus, the volume of RSM is dependent on the required dose sensitivity needed to assess personal dose. Higher doses of radiation generate larger numbers of ESR-visible free radicals and require smaller volumes of RSM to arrive at a calibrated dose. Lower doses of radiation generate comparatively smaller numbers of ESR-visible free radicals and require larger volumes of RSM. This volume ratio assumes a fixed ESR measurement time. If the ESR measurement times can be extended, then similar volumes of RSM can be used for both higher and lower dose assessments.

The placement of the RSM within the thickness of the ID card is somewhat inconsequential. The ESR measurement is sensitive to the volume of RSM throughout the ID card. The pocket of RSM could be offset to either the top or bottom faces, with very little consequence to the dose assessment, area placement is subject to detector instrument probe alignment.

Figure 2A:
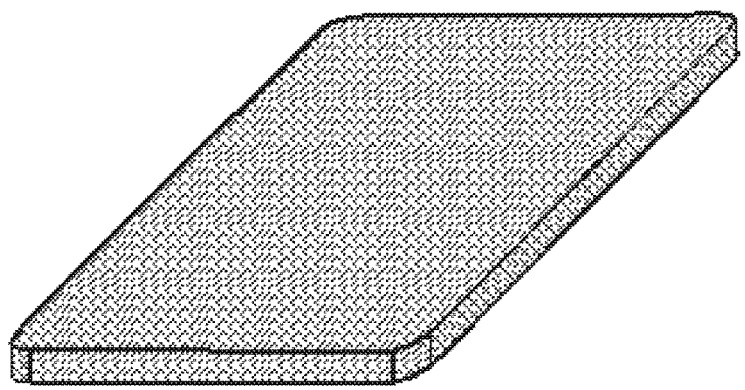
FIGS. 2A and 2B. show another embodiment of the ID card containing a personal dosimeter, radiation-sensitive material dispersed throughout the entirety of the card or a layer thereof, e.g. as in the exploded laminate construction of FIG. 2B.
Figure 2B:
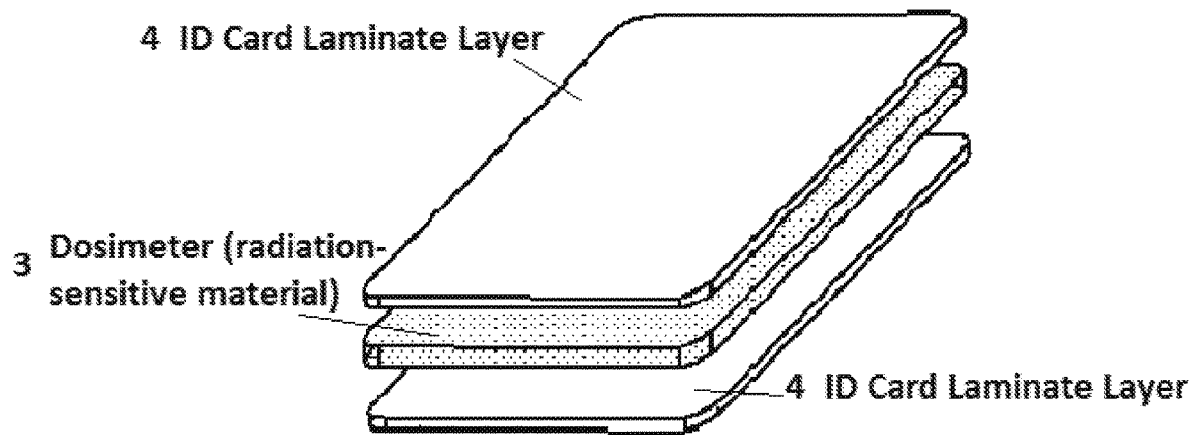

FIG. 2. Shows in isometric form and FIG. 2A shows in exploded form an additional embodiment could consist of an ID card in which the RSM is dispersed in sufficient density throughout the ID card. In this case, any or all portions of the card 1 could be used in the ESR measurement and the associated derivation of personal dose, provided that the ESR transmission-line-structure design was modified to accept this larger volume of RSM 2.

Figure 3:
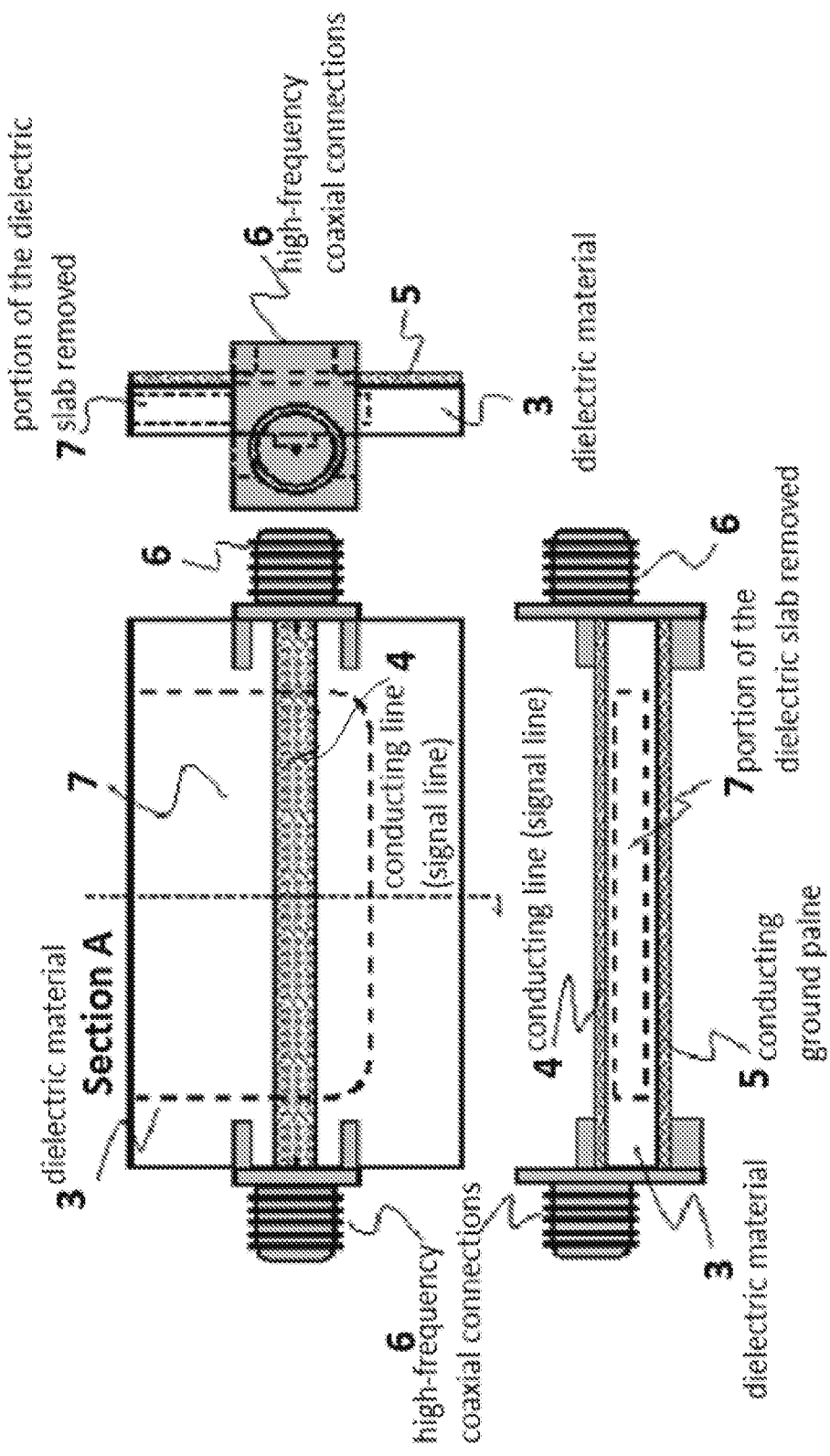
FIG. 3 shows in top, side end views, a non-resonant, transmission-line structure of a detecting ESR instrument probe component (probe) including, a hollowed-out region that complements the radiation-sensitive ID card interposed between the top signal line and the bottom ground plane (bottom view, end view and side view, same as in FIG. 1)

FIG. 3 shows in partially sectional top, side edge and end-views the relation of the card inserted into a detection slot 7 of a radiation dose detector instrument, the lateral placement of the RSM within the ID card depends only upon the construction of the non-resonant ESR transmission line structure. The transmission-line 4 (between connecting terminals 6 and ground plane 5) structure defines the active volume over which the ESR measurement probes. For the simple reason of ease of transmission line structure design and fabrication, this region is normally located near an edge of the ID card. The pocket of RSM may be laterally located anywhere within the ID card provided that the ESR transmission line structure (FIG. 3) was designed to access the chosen placement. The ESR transmission-line structure, similar to the common microstrip geometry, comprises a slab of dielectric material 3 with a defined conducting line (signal line) 4 on one side of the dielectric and a conducting ground plane 5 on the other side of the dielectric 3. A microwave signal is introduced into the symmetric transmission line structure via suitable high-frequency coaxial connections 6. These include, but are not limited to, the common SMA connectors, 2.4 mm connectors, and 1.8 mm connectors. The symmetry of the transmission line structure dictates a universality in signal propagation direction, with either side of the transmission line structure able to function as the microwave signal input while the complementary side serves as the microwave signal output. The composition of the dielectric material, the thickness of the dielectric material, and the geometry of the signal line can be designed to determine the transmission line structure's effective impedance to microwave signal transmission. The purpose of the transmission line structure is to guide the alternating electric fields and magnetic fields of microwave signal through the structure. The vast majority of the alternating electric and magnetic fields are located between the signal line and the ground plane, directly under the signal line. The ESR measurements used to derive personal dose require the application of a uniform microwave magnetic field ($B_1$) to the RSM. Accuracy and speed can be enhanced by incorporating it perforations or fissures in the transmission line conducting surfaces to improve magnetic field modulation thereby allowing faster scans and the use of rapid scanning detection artifacts, both increasing speed and accuracy of measurements.

FIG. 3 shows a portion of the dielectric slab removed, as shown at 7 to gain viewing access to the guided microwave magnetic field. The portion removed can be designed such that it complements the dimensions of the radiation-sensitive ID card. In this embodiment, the ID card can be inserted into the slot 7 in the transmission line structure such that the RSM is located entirely between the signal line and the ground plane, thus maximizing the exposure to the microwave magnetic field and facilitating the ESR detection of stable free radicals and consequent transfer dosimetry. The composition of the dielectric material, the thickness of the dielectric material, and the geometry of the signal line, the geometry of the slot in the dielectric slab, the material composition of the identification card and the material composition of the RSM can be designed to determine the transmission line structure's effective impedance. In this embodiment, the impedance was designed to be 50 ohms, such that it would be compatible with the clear majority of microwave equipment, though in principle, any impedance could be designed.

Figure 4:
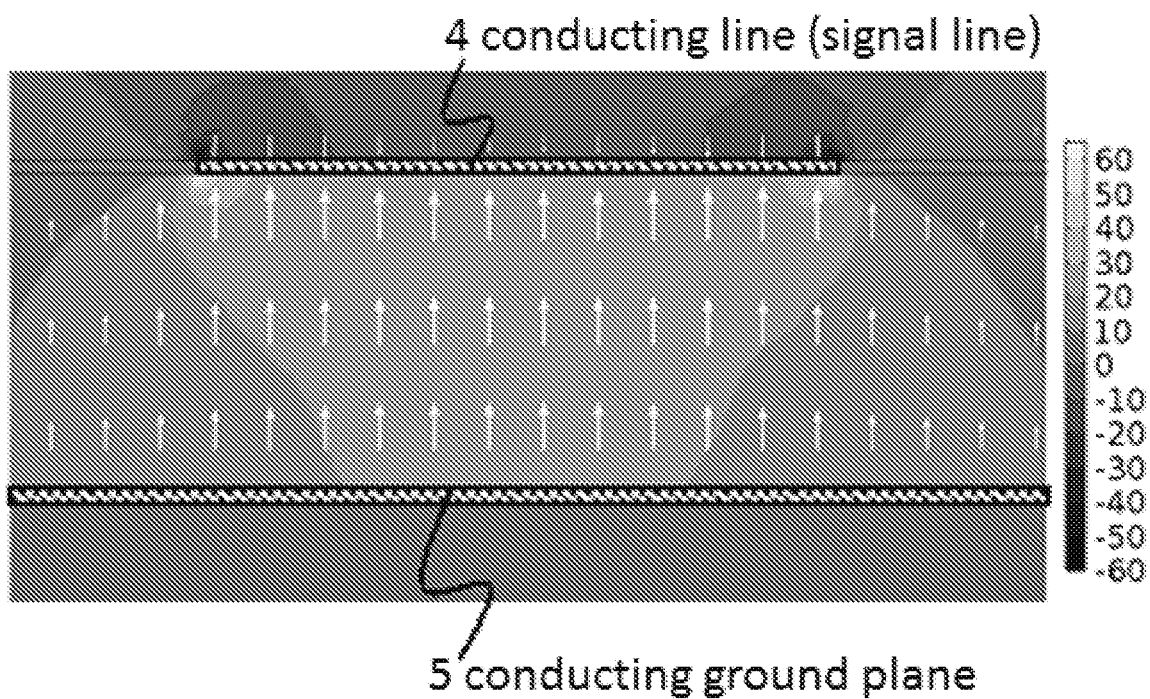
FIG. 4 is a cross-sectional view (section A of FIG. 3) of the non-resonant transmission line overlaid with finite-element simulations of the microwave magnetic field (B1) between the top connecting line (signal line) and the bottom ground plane with shading gradations indicating the microwave magnetic flux density in μT with proportional arrows to indicate the electric field direction (simulation is shown for 8.5 GHz with an input power of +25 dBm)

FIG. 4 is a cross-sectional view of the transmission-line structure (Section A of FIG. 3) indicates the microwave magnetic field between the top signal line 4 and the bottom ground plane 5. Finite-element simulations are overlaid to give an indication of the typical magnetic fields present in such a structure. The shade gradations indicate the magnetic flux density in units of microtesia while the proportional arrows indicate the direction of the electric field. Simulations were performed for an input microwave signal +25 dBm at 8.5 GHz. These simulations serve as an indication of the uniformity and magnitude of the microwave magnetic field present in such a transmission-line structure between the top signal line and the ground plane. Conventional ESR measurements (utilizing a resonant cavity detector) require microwave magnetic flux densities of approximately 10 microtesla. The simulations in FIG. 4 indicate the presence of microwave magnetic fields at levels more than adequate to induce ESR transitions in the RSM 3 located within the ID cards 1.

Figure 5:
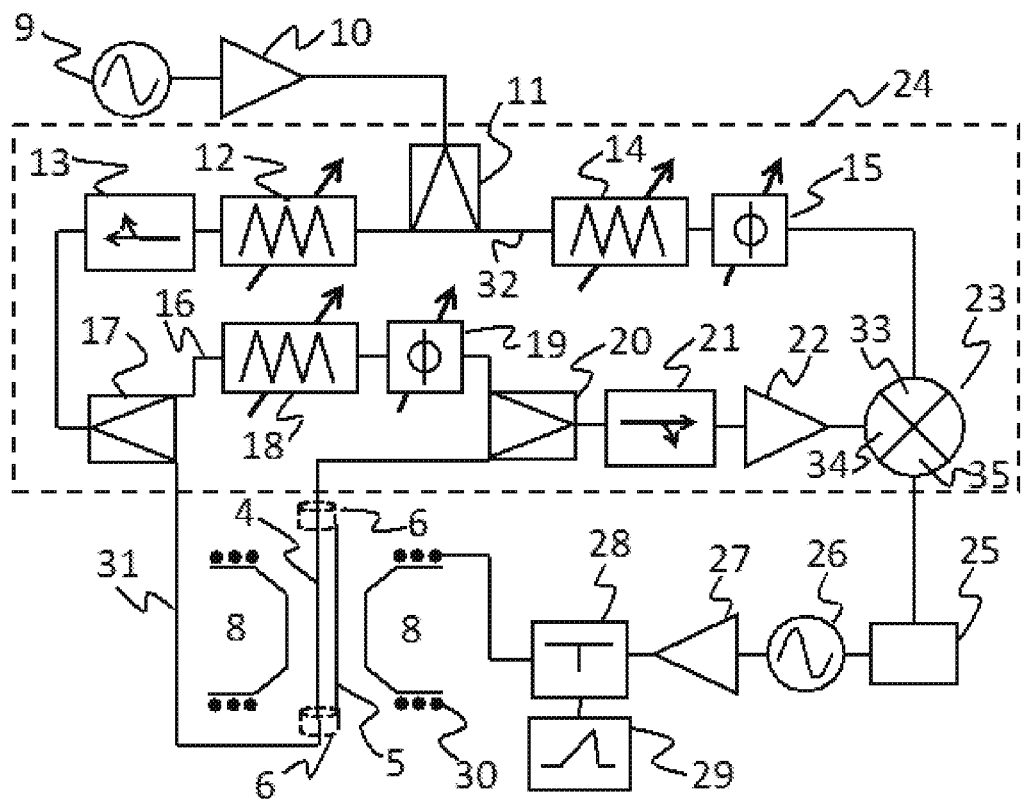
FIG. 5 is a circuit diagram showing an embodiment of the apparatus implementing the detector instrument.

FIG. 5 is a circuit diagram of the ESR-based radiation dosimetry sensor. At the center of the measurement zone is the non-resonant transmission-line probe. The ID card containing RSM is inserted in the complementary slot in the non-resonant transmission-line probe. These two structures are co-located between the poles of a suitable magnet 8 that provides a large quasi-static magnetic field, $B_0$, which is slowly varied through the help of electromagnetic coils 30 around the ESR condition to sweep out the spectrum. For this embodiment, $B_0$ is approximately 300 mT, that is appropriate to induce ESR transitions for input microwave frequencies of approximately 9 Ghz. A second magnetic field, $B_m$, is also generated using 30 and is a sinusoidal modulation of the quasi-static magnetic field at audio frequencies with amplitudes of approximately ≤1 mT. This modulating magnetic field ($B_m$) serves to enhance the measurement sensitivity using conventional phase-sensitive detection (lock-in amplifier). The non-resonant transmission-line structure interfaces with ultra-sensitive ESR bridge circuitry that is used to both excite and detect ESR transitions in the RSM. The ultra-sensitive bridge circuitry is also borrowed from the above referenced '004 patent to the extent shown in FIG. 5. The operation of the microwave bridge circuitry and the detailed steps needed to simultaneously sweep and modulate the externally applied magnetic field are discussed below. ESR detection of the dose-dependent RSM proceeds essentially in the fashion discussed in the '004 patent allowing for non-resonant ESR transmission in the present construction.

FIG. 5 shows an electron spin resonance spectrometer embodiment that includes a heterodyne detection system bridge circuit 24. Here, an excitation frequency issues from excitation source 9. Amplifier 10 amplifies the excitation frequency before it is transmitted to bridge 24 where the excitation frequency is split by splitter 11 and transmitted to local oscillator arm 32. Along local oscillator arm 32, the excitation frequency is subjected to attenuation by attenuator 14 and a phase shift by phase shifter 15 before being received by local oscillator input 33 of mixer 23. Mixer 23 also receives a combined frequency output from combiner 20, which is amplified by amplifier 22.

Besides being transmitted to local oscillator arm 32, some of the power of the excitation frequency from splitter 11 is transmitted to the non-resonant probe 4,5 through the high frequency coaxial connectors 6 via attenuator 12 and pick-off tee 13 before being split by splitter 17 and simultaneously transmitted through reference arm 16 and sample arm 31. This energy is transmitted through the resonant probe to combiner 20.

Concurrently, reference arm 16 communicates the excitation frequency from excitation source 9 through attenuator 18 and phase shifter 19 so that the excitation frequency from sample arm 31 and reference arm 16 are coincident at combiner 20 and can destructively combine. Due to destructive combination of the excitation frequency combined at combiner 20 from reference arm 16 (the excitation frequency) and sample arm 31 (the excitation frequency transmitted through the non-resonant probe, 4,5 and high frequency coaxial connectors 6 in the absence of absorption by a sample) are either in phase and constructively combine or are out of phase and destructively combine. The resulting superposition of the combination of the excitation frequencies from reference arm 16 and sample arm 31 can be made to have zero amplitude (or approximately zero amplitude) by adjusting phase shifter 19 so that bridge 24 is balanced and produces the combined frequency having zero amplitude or a very low amplitude.

When the excitation frequency from reference arm 16 and sample arm 31 are present at combiner 20, reference arm 16 and sample arm 31 are balanced and the combined frequency that is output from combiner 20 has a low amplitude, perhaps zero. However, when the RSM absorbs the excitation frequency, and the signal frequency is present at combiner 20, reference arm 16 and sample arm 31 are unbalanced. For the unbalanced case, the combined frequency output from combiner 20 is proportional to the number of unpaired electrons present in an excitation volume non-resonant probe 4,5 that absorbs power from the excitation frequency. As mentioned, combiner 20 transmits the combined frequency to radiofrequency input 34 of mixer 23. Pick-off tee 21 can be interposed between combiner 20 and amplifier 22 to allow monitoring of the combined frequency.

Mixer 23 mixes the combined frequency at radiofrequency input 34 and the excitation frequency at local oscillator input 33 and produces a detection frequency (e.g., an intermediate frequency) at output port 35 of mixer 23. The detection frequency is transmitted subsequently to phase sensitive detector 25, which is locked to a phase and frequency of reference oscillator 26. In this arrangement, use of phase sensitive detector 25 to monitor the detection frequency at a frequency and phase of the reference frequency accomplishes heterodyne detection of the resonant absorption of the excitation frequency by RSM as a function of the excitation frequency and magnetic field strength. Therefore, in an embodiment, the electron spin resonance spectrometer includes the bridge that bas the local oscillator arm, which includes the mixer, such that the bridge is configured to produce the detection frequency and transmit the detection frequency to the detector.

Magnet poles 8 are disposed proximate to probe 4,5 of electron spin resonance spectrometer, and modulation coil 30 is disposed on a surface of magnet 8. Electron spin resonance spectrometer is configured to receive RSM in an ID card form factor proximate to the non-resonant probe 4,5, modulation coil 30, and magnet 8. Magnet 8 applies a magnetic field to the RSM, and modulation coil 30 modifies the strength of the magnetic field applied to the RSM. When the RSM includes an unpaired electron, the applied magnetic field from magnet 8 or modulation coil 30 perturbs the energy levels associated with the magnetic spin quantum number according to the Zeeman effect. As a result, the energy levels associated with the unpaired electron, are split as a function of the magnetic field strength, and a transition between spin states (m, $=\pm\tfrac{1}{2}$) of the electron occurs when the excitation frequency is resonant with the energy difference between two magnetic spin states of the unpaired electron. Here, a single unpaired electron is discussed, but the RSM may contain a plurality of unpaired electrons that potentially are perturbed by the magnetic field. Thus, an electron spin resonance transition (i.e. a transition between electron magnetic spin states given by the magnetic quantum number m) occurs for the RSM present in the applied magnetic field from magnet 8 (or as modified by modulation coil 30) when the excitation frequency subjected to the RSM through the non-resonant probe 4,5 matches the frequency separation between the magnetic sublevels of the unpaired electron. In this manner, sample the RSM absorbs some power from the excitation frequency from the non-resonant probe 4,5. As a result, the amount of power of the excitation frequency that is transmitted through the non-resonant probe 4,5 is less than the power of the excitation frequency in the absence of the RSM undergoing an electron spin resonance transition. As discussed below, when an electron spin resonance transition occurs, the transmitted excitation frequency is referred to as a signal frequency because it includes information about the reference frequency applied to the RSM from modulation coil 30. Moreover, when the RSM is absent or does not absorb power from the excitation frequency (because the excitation frequency is not resonant with the Zeeman splitting of the energy levels of the unpaired electron), the excitation frequency is transmitted to combiner 20 so that bridge 24 remains balanced.

When the RSM absorbs power from the excitation frequency, the signal frequency is transmitted to combiner 20. However, bridge 24 was balanced with respect to the excitation frequency transmitted to the non-resonant probe 4,5 and not the signal frequency transmitted through the non-resonant probe 4,5 In the presence of the signal frequency at combiner 20, bridge 24 is unbalanced such that a combined frequency output from combiner 20 has an amplitude that is proportional to the signal frequency (i.e. an amount of power of the excitation frequency that is absorbed by the RSM).

Reference oscillator 26 produces and transmits the reference frequency to phase sensitive detector 25 as well as modulation coil 30 interposed between magnet poles 8 and the non-resonant probe 4,5. Bias tee 28 receives the reference frequency from amplifier 27 and a bias voltage from power source 29 (e.g., a sweep generator) and transmits (as an output to modulation coil 30) the reference frequency biased at the level of the bias voltage. Hence, modulation coil 30 receives the reference frequency biased at a level of the bias voltage so that modulation coil 30 modulates the magnetic field strength from magnet 8 that is applied to the non-resonant probe 4,5. It is contemplated that modulation coil 30 is configured to receive the bias voltage, the reference frequency, or a combination thereof. In this manner, the signal frequency transmitted through the non-resonant probe 4,5 is modulated at the reference frequency of reference oscillator 26 corresponding to modulated absorption of the RSM in the applied magnetic field. In this arrangement, phase sensitive detector 25 is part of a homodyne detection system wherein an absorption of the excitation frequency by the RSM is modulated at the frequency of the reference frequency, and the amplitude of the absorption is proportional to the number of unpaired electrons (or a defect density) in the RSM that are within the excitation volume of the non-resonant probe 4,5. Furthermore, absorption by the RSM occurs at the frequency of the excitation frequency that is resonant with the separation of the electron magnetic spin states due to the strength of the magnetic field from a combination of magnet 8 and modulation coil 30.

Figure 6:
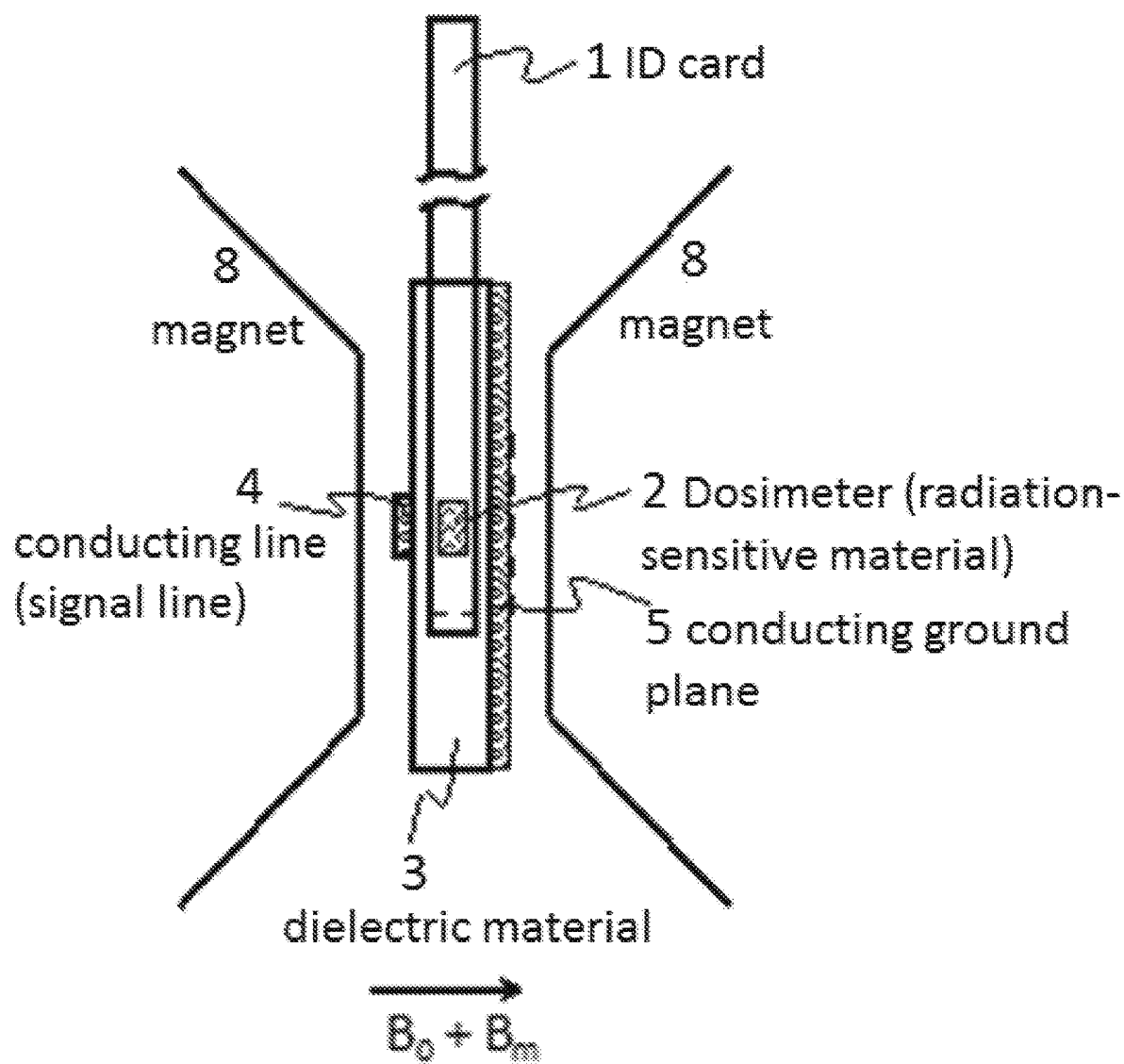
FIG. 6 shows the personal dosimeter ID card, containing radiation sensitive material inserted in the non-resonant transmission-line probe, which is located between the poles of a suitable magnet. In this embodiment, the radiation-sensitive material is simultaneously subject to a large quasi-static magnetic field ($B_0$), a microwave magnetic field ($B_1$), and an audio frequency modulation of the large quasi-static magnetic field ($B_m$)

FIG. 6 shows schematically an ID card containing RSM and the transmission-line structure is placed between the poles of a suitable magnet 8. The transmission-line structure is aligned such that the signal line 4 and ground plane 5 are parallel to the pole faces of the magnet, or perpendicular to $B_0$. This ensures orthogonality between $B_1$ and $B_0$ and thus facilitates ESR transitions. The ID card containing RSM is placed within the slot of the dielectric slab 7 in the transmission-line structure. The suitable external magnet can exist in many forms, which include but are not limited to conventional resistive electromagnets, conventional superconducting magnets, and permanent magnet arrangements with the appropriate coils needed to sweep and modulate $B_0$ at values that will induce ESR transitions.

Figure 8:
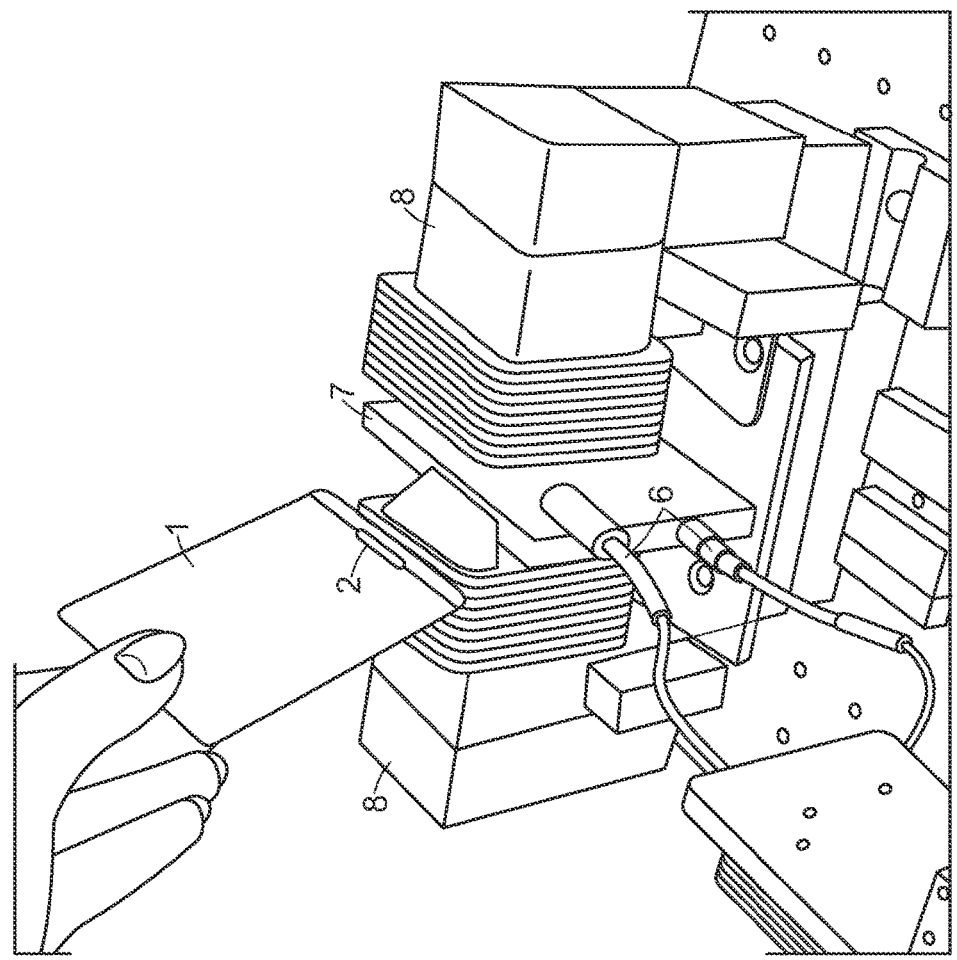
FIG. 8 is a further side-view photograph of the non-resonant transmission line, ID card with radiation-sensitive 'pocket,' and magnet apparatus of the detector instrument.
Figure 7:
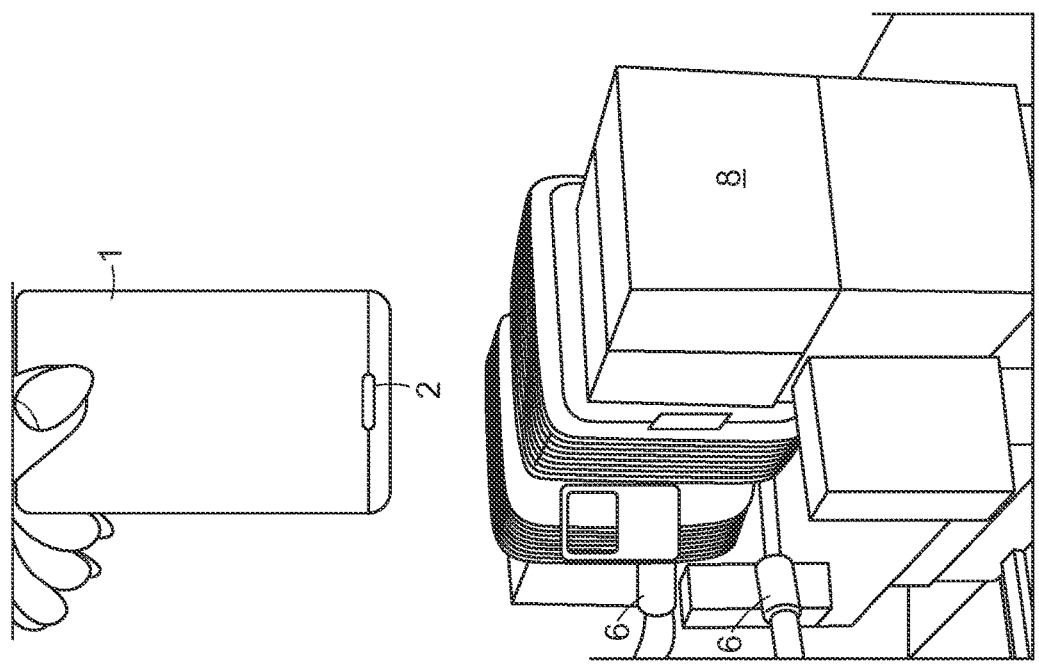
FIG. 7 is a photograph of the card being inserted into proximity with the non-resonant transmission line matching radiation-sensitive 'pocket,' and the magnet apparatus of the detector instrument.

FIG. 7 and FIG. 8 are photographs of prototypes of the experimental apparatus that includes the ID card 1 with radiation sensitive 'pocket' 2. The transmission-line structure is somewhat obscured between the poles and coils of the magnetic apparatus 8 with only the microwave signal input and output connectors 6 visible. Other features of the instrument are shown in U.S. Pat. No. 9,507,007 ('004) cited above, except as otherwise modified herein.

Figure 9:
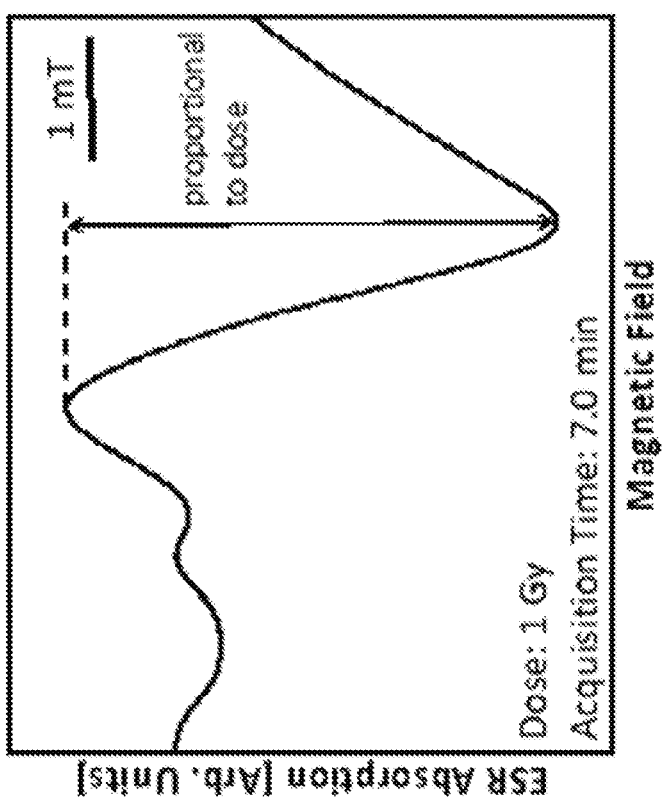
FIG. 9 is a trace of an electron-spin-resonance first-derivative absorption spectrum of the central peak of an L-alanine free radical electron-spin-resonance spectrum, is the result of 1,000 Gy of gamma irradiation of 50 mg of L-alanine embedded in an ID card medium for a total measurement time of 10 ms.

FIG. 9 is a micrograph trace of the first-derivative ESR absorption spectrum of the central peak associated with the gamma radiation-induced stable free radical of in the crystal amino acid, L-alanine. Crystalline L-alanine (90% by weight) was mixed with polyethylene (10% by weight) and pressed into a 15 mm×4 mm×0.6 mm pellet at 150 C using a conventional pill press. The final mass of the L-alanine pellet was approximately 50 mg. The pellet was then embedded in a 0.762-mm-thick standard-size identification card within a pocket large enough to accommodate the L-alanine pellet. The entire ID card was then subject to 1,000 Gy of gamma irradiation. The peak-to-peak height of the first-derivative spectrum of the central peak serves as a proxy for the patient-received dose. The spectrum was taken at 8.8 GHz at a power of +25 dBm. The magnetic field center was approximately 300 mT and was scanned approximately 10 mT with an 0.8 mT modulation field at 100 kHz. A lock-in amplifier referenced to the modulation frequency recorded the absorption. The total acquisition time was 10 ms (1 scan).

The forms of effective RSM can be varied from the pellet described above including, e.g. (a) reduction of pellet size from the 15 mm×4 mm×0.6 mm used above to smaller sizes e.g. 5 mm×4.5 mm×0.6 mm (about 15 mg) yielding an increase of yield of say 1 kilogram of material (from about 100,000 pellets at 15 mm×4 mm×0.6 mm to about 300,000 at 5 mm×5 mm×0.6 mm), (b) round, square, elliptical, rectangular pellets or dishes or other, tetrahedral, spherical, rod or oblate solid forms, (c) as gels or (d) in fluid forms including slurries and emulsions. The fluid forms can be present at the compartment for interfacing the spectrometer magnetic field or contained elsewhere and fed to the components at the time of measurement microfluidic channels leading to the compartment under various forms of drive including peristaltic rolls, finger pressure, electrostatic, electromagnetic or otherwise. Alternatively, various RMS locations of the RSM content of the card can be presented to the component field sequentially and the readings summed.

Figure 10:
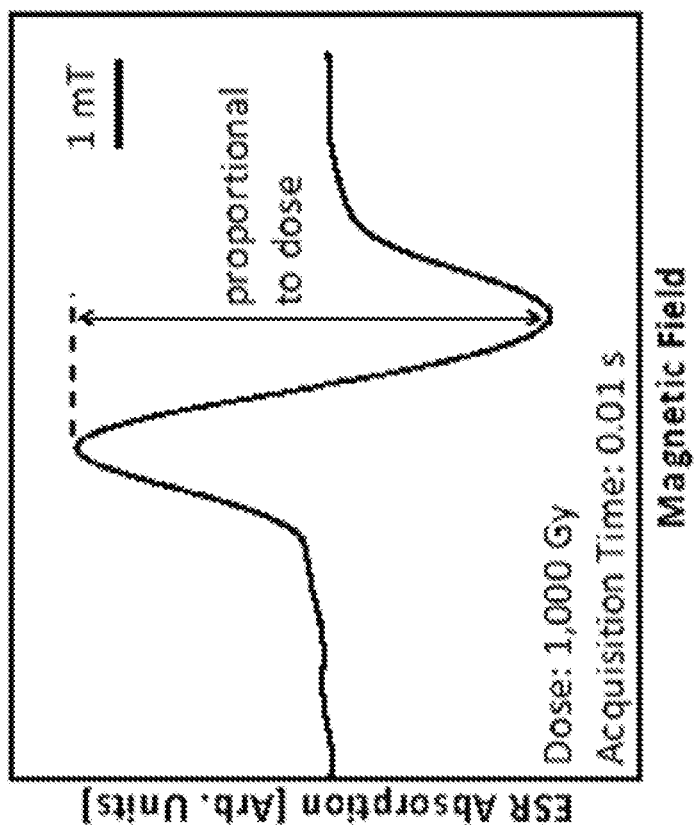
FIG. 10 is a trace of ESR first-derivative absorption spectrum of the central peak of the L-alanine free radical electron-spin-resonance spectrum, the result of 1 Gy of gamma irradiation of 50 mg of L-alanine embedded in an ID card medium for a total measurement time of 7 minutes.

FIG. 10 shows a first-derivative ESR absorption spectrum of the central peak associated with the gamma-radiation-induced free radical in crystalline alanine, which was subject to 1 Gy of gamma radiation. The sample preparation was identical as that described for FIG. 9, with the only difference being the received radiation dose. The total acquisition time for this measurement was 7 minutes. The spectrum illustrated in FIG. 10 is substantially more sensitive than that shown in FIG. 9. This is due to a variety of experimental optimizations, which allow the transmission-line structure to better complement the ID card. These optimizations include subtle geometric changes to the signal line 4 of the transmission line structure to insure a good impedance matching of the transmission-line structure (with the ID card inserted). In general, these optimizations represent a series of steps to best match the transmission line geometry and impedance to the standard ID card form factor.

L-alanine was chosen for these measurements, as it has a known stable radiation-induced free radical. However, the present inventions need not be limited to L-alanine, though it is presently preferred, as there are a variety of other radiation-sensitive material (RSM) candidates suitable for this application, e.g. dense hydroxyapatite $[Ca_{10}(PO_4)_6(OH)_2]$; lithium or calcium formate. The measurements were also taken at $B_0$ values of approximately 300 mT and microwave frequencies of approximately 9 GHz. These resonance conditions were chosen for compatibility with conventional room-temperature ESR measurements and do not represent limitations on operation conditions. In principle, as long as the resonance condition is met, both $B_0$ and the microwave frequencies can scale to meet the application's needs.

The general public would employ this design of the ESR-based dosimetry system as follows. An individual would insert the ID card into the ESR sensor, after which the system returns a received dose value and instructions for further action. Using the non-resonant transmission line structure also allows for a downsizing of much of the ancillary infrastructural equipment. The complete system drastically reduces the physical weight and foot print of the ESR spectrometer, and facilitates use of personal dosimeters and detector instrumentation, in highly deployable packages suitable for delivery during or soon after (preferably before) the mass-casualty radiation event.

The devices and methods can be used to measure radiation dose in close proximity to humans, animals, plants and objects after radiation that requires rapid mitigation steps, or to confirm none or non-significant injury, and eliminate subjects to allow effective mitigation activities. The device and system as a whole (i.e., with devices analogous to the card form factor dosimeters described above) can also be used for rapid, widespread analysis of large populations, to deal with other mass casualty conditions (actual or supposed) other than radiation energy spectrum events such as chemical toxic biological releases, or infection spreads/ pandemics via various vectors.

The identification-card form factor can also carry related information about the projected subject who carries it (or may have it affixed or embedded), for example: card identification/association, affiliations, medical conditions or history, emergency contact information, special needs, and/or exposure monitoring (presently or retrospectively).

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references referred to herein by citation or description without citation are incorporated herein by reference and without prejudice to contrasting prior art or other significant relevance to patentability. The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

The invention claimed is:

1. An operational physical dosimetry system deployable as a retrospective public health counter measure comprising:
    (a) individual devices usable for associating with a population of subjects to be protected, i.e. humans and animals, or inanimate objects, the devices being of identification card form factor to be carried on or associated with persons, animals or objects routinely or close in proximity, thereto to be easily accessed by a radiation status instrument,
    (b) a radiation responsive variable characteristic material contained in or coated on or otherwise combined with each device and having properties of (1) immediate and stable preservation of a radiation exposure effect, changing characteristics of the material detectable by one or more types of radiation sensing instruments and (2) wherein the radiation variable material is responsive to incident radiation exposure in one or more bands of the electromagnetic spectrum to undergo a shift in measurable characteristics as a result of one or more exposures and retain a count of such shifts from such exposures cumulatively after the events,
    (c) a radiation status measuring ESR instrument configured for operation in non-resonant mode for detecting predictable electron spin changes as a result of radiation to cumulatively measure quantity of radiation exposure,
    (d) wherein the radiation status instrument is an ESR instrument configured for operation in a single ESR spectrum mode with opposing magnet poles configured to receive the devices and put a magnetic field through each such device and allow withdrawal and configured with a transmission line microwave probe with conducting surfaces mounted on the instrument and configured for excitation and detection operation and comprising coils to sweep and modulate magnetic fields across the radiation sensitive material of a device to be tested to establish and record a resonance spectrum.

2. The system of claim 1 wherein perforations or fissures are incorporated into the transmission line conducting surfaces to improve magnetic field modulation at higher frequencies.

3. The system of claim 1 wherein the variable characteristic of the radiation sensitive material is a paramagnetic free radicals content.

4. The system of claim 3 wherein the radiation sensitive material comprises L-alanine.

5. The system of any of claims 1-4 constructed and arranged to function with reliability exceeding 99% at clinically significant level of 2 Gy+/−0.5 Gy enabled by use of a stable crystalline structure immediately and permanently responsive in a linear response to ionizing radiation.

6. The system of claim 5 wherein a permanent magnet is provided in the ESR instrument.

7. A method of implementing a large scale radiation exposure measurements strategy comprising
    (a) deploying to a population of subjects (person, animals and objects) to be served thereby devices of identification card form factor to carried on or otherwise physically associated with the subjects and accessible to a radiation status measuring instrument,
    (b) the devices containing or having coated thereon or otherwise combined therewith a radiation responsive variable characteristic material contained in or coated on or otherwise combined with each device and having properties of (1) immediate and stable preservation of a radiation exposure effect, changing characteristics of the material detectable by one or more types of radiation sensing instruments and (2) wherein the radiation variable material is responsive to incident radiation exposure in one or more bands of the electromagnetic spectrum to undergo a shift in measurable characteristics as a result of one or more exposures and retain such shifts cumulatively after the events,
    (c) deploying ESR radiation status measuring instruments configured for operation in a single ESR spectrum mode with magnet poles and configured with a transmission line microwave probe with conducting surfaces mounted on the instrument and configured for excitation and detection operation and comprising coils to sweep and modulate magnetic fields across the radiation sensitive material of a device to be tested to establish and record a resonance spectrum.

8. The method of claim 7 wherein perforations or fissures are incorporated into the transmission line conducting surfaces to improve magnetic field modulations at higher frequencies.

* * * * *